United States Patent [19]

Kanzaki et al.

[11] E Patent Number: Re. 32,512

[45] Reissued Date of Patent: Sep. 29, 1987

[54] METHOD FOR PRODUCING FOIL ELECTRODES FOR ELECTROLYTIC CAPACITOR

[75] Inventors: Nobuyoshi Kanzaki, Jyoyo; Kenji Toyama, Uji; Katsutoshi Nakano, Jyoyo; Ryoichi Shimatani, Hirakata; Fumio Kudo, Neyagawa, all of Japan

[73] Assignee: Matsushita Electric Industrial Co., Ltd., Kodoma, Japan

[21] Appl. No.: 393,033

[22] Filed: Jun. 28, 1982

Related U.S. Patent Documents

Reissue of:

[64] Patent No.: 4,276,129
Issued: Jun. 30, 1981
Appl. No.: 162,738
Filed: Jun. 25, 1980

[51] Int. Cl.[4] ..... C25D 11/08; C25D 11/10

[52] U.S. Cl. ..... 204/58

[58] Field of Search ..... 204/58, 129.4, 129.95

[56] References Cited

U.S. PATENT DOCUMENTS

| | | | |
|---|---|---|---|
| Re. 31,743 | 11/1984 | Arora | 204/129.9 |
| 2,180,798 | 11/1939 | Collins | 204/58 |
| 2,685,563 | 8/1954 | Gauthier | 204/58 |
| 4,297,184 | 10/1981 | Dyer | 204/129.4 |

FOREIGN PATENT DOCUMENTS

| | | | |
|---|---|---|---|
| 329190 | 5/1930 | United Kingdom | 204/58 |
| 1513532 | 6/1978 | United Kingdom | 204/58 |

*Primary Examiner*—T. M. Tufariello
*Attorney, Agent, or Firm*—Cushman, Darby & Cushman

[57] ABSTRACT

Optimum conditions, employed in an etching process of an aluminum foil for use in an electrolytic capacitor, are selected and combined together for realizing an extension of the effective surface area of the foil. This extension also gives an enlargement of the electrostatic capacitance of the foil electrode as well as an enhancement of the mechanical strength of the foil itself, the latter had been considered to be hardly compatible with the former.

4 Claims, 5 Drawing Figures

METHOD FOR PRODUCING FOIL ELECTRODES FOR ELECTROLYTIC CAPACITOR

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention generally relates to a method for producing foil electrode for use in aluminum electrolytic capacitor. Particularly, it is concerned with a method for etching an aluminum foil which has an excellent characteristic as an electrode.

2. Description of the Prior Art

As is well known, the aluminum foil employed as an electrode for electrolytic capacitor must have a coarse surface of an extended effective surface area for the purpose of miniaturizing the size of, minimizing manufacturing cost of and/or improving the electrical characteristics of the products. Treatments of the aluminum foil for making it to have the coarse surface of the extended effective surface area are usually referred to as "etching process" and have customarily been performed in an aqueous solution by chemically or electrochemically.

In this field of etching process, there has hitherto been made a variety of studies and a number of proposals for attaining great industrial advantages. As a result of the detailed analysis of these studies, the following four principal factors, which greatly influence the performance of the etching process, i.e., extending rate of the effective surface area of the etched foil, are pointed out, and individual technical know-hows are established for each of the four factors:

1. Aluminum foil (purity of the metal; species, amount and mode of dispersion of impurities in the metal; orientation, size and shape of the crystal grain of the metal; and oxide film covering the surface, state and thickness), 2. Etching solution (species and concentrations of principal ingredient and additives; and temperature), 3. Power supply (direct current, alternating current, direct current superimposed with alternating current, waveform; and current density), and 4. Auxiliary treatment (pretreatments, intermediate treatments and combinations of these treatments).

Although it has been known that all of these factors can separately and independently influence the performance of the etching process and the configuration of the etched surface of the aluminum foil, it is confirmed that what is highly important for the performance and the configuration is the complexities, i.e., the interactions or mutual dependencies between and among these individual factors. In the other words, one of these factors in a given state may adversely interfere or synergetically cooperate with the other factor to create a combined influence on the performance of the configuration.

SUMMARY OF THE INVENTION

It is therefore the principal object of the present invention to provide a method for producing foil electrode for use in an aluminum electrolytic capacitor which has an excellent electrical characteristics.

It is another object of the present invention to provide an etching process on an aluminum foil which gives the foil a large effective area while maintaining a good mechanical strength of the foil.

In order to attain the stated objects, the present inventors have explored the previously described various factors involved in the formation, distribution, configuration and growth of the etching pits by observing them with an electron microscope and the like, keeping their minds to the points:

1. To raise the density of the etching pits as high as possible and to distribute them over the entire surface as even as possible, 2. To make the diameter of each etching pit as small as possible, say, for instance, 0.2 μm, and as uniform as possible, and 3. To form the etching pits to an extent that they do not grow too deep to penetrate the foil completely in order to maintain the mechanical strength of the foil.

As a result of the exploration, it is finally confirmed that a maximum performance of the etching process can be expected under conditions described later in connection with the preferred embodiment.

DESCRIPTION OF THE PREFERRED EMBODIMENT

Figure 1:
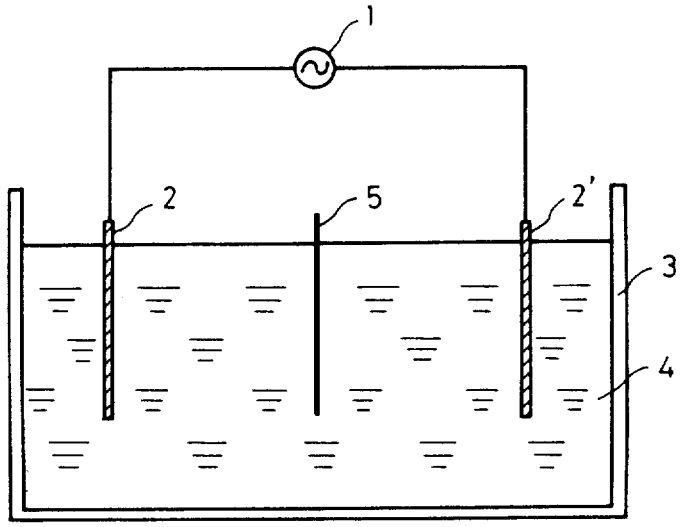
FIG. 1 is a schematic diagram showing an arrangement for the electrodes in an etching tub.

According to the present invention, there is provided an improvement in or relating to the method of enlarging effective surface area of aluminum foil for use in electrolytic capacitor by electromechanically etching said aluminum foil in an aqueous etching solution including hydrogen chloride and at least one additives capable of anodizing, that is, forming porous oxide film on, the surface of said aluminum foil with power supplied in alternating current, which comprises; the concentration of the hydrogen chloride in said solution is set at a range between 0.5 N and 3.5 N, the total concentration of said additives in said solution is set at a range between 0.001 mole/liter and 0.4 mole/liter, and said alternating current is being supplied at a frequency ranging from 5 Hz to 120 Hz and in a current density ranging from 0.1 $A/cm^2$ to 0.6 $A/cm^2$ while the temperature of said solution is being kept at 25°–60° C.

In the method of the present invention, the concentration of the hydrogen chloride in the etching solution must be in the range between 0.5 N and 3.5 N. This range is determined by considering it in association with the other factors, in order to form etching pits as many as possible, to distribute these over the aluminum surface as evenly as possible in conformity with the quality of aluminum material dominated particularly, by its purity and the orientation of the crystal grain, and in order to reduce the adverse effect of the oxide film covering the surface of the aluminum foil. When the concentration of hydrogen chloride in the solution is under 0.5 N adverse effect due to the oxide film covering the surface of the aluminum foil and/or the detective parts on the surface of the aluminum foil will become great to result in an uneven distribution and a decrease in the number of the etching pits. On the other hand, a concentration of the hydrogen chloride over 3.5 N may result in the increase in the number of the pits but may create drawbacks of surface dissolution and of too shallow undergrown pits.

The additive, incorporated into the etching solution together with the hydrogen chloride as an auxiliary agent capable of anodizing aluminium to form a porous oxide film thereon, has an advantage of inhibiting the dissolution of aluminum surface by virtue of its oxidizing activity on the aluminum metal. Namely, in a spot of the surface of the aluminum foil where an oxide film is formed, the etching action is weakened while another spot of the surface being chemically active is only subjected to the etching action to promote a deep growth of an etching pit. At the same time, by preventing chemical dissolution of the metal surface such as chemical or electrolytic polishing which may occasionally occur at the surface, the effective surface area of the metal is greatly extended.

These additives may be exemplified as; aliphatic monocarboxylic acids such as acetic acid and propionic acid; aliphatic dicarboxylic acids such as oxalic acid, malonic acid, succinic acid, glutaric acid, adipic acid, maleic acid and fumaric acid; aliphatic oxcarboxylic acids such as glycolic acid, lactic acid, malic acid, tartaric acid and citric acid; and inorganic acids such as nitric acid, phosphoric acid, sulfuric acid, boric acid and [sulfamilic] *sulfamidic* acid. These acids may be used as such, i.e. free acids or as any salts thereof, and may be used singly or as one combined with one or more species selected from those exemplified above.

The total concentration of these additives must be kept in a range between 0.001 mole/liter and 0.4 mole/liter. At a concentration under 0.001 mole/liter, no advantage will result from the addition because it only effective to the increase in the number of the etching pits but no effect is expected in the deep growthes of these pits. At a concentration over 0.4 mole/liter, the effective surface area decreases because the addition is only effective to the deep growthes of the etching pits of the larger diameters but of the smaller numbers.

Incidentially, there has hitherto been known the use of etching power supply of direct current in a waveform containing a large amount of ripple component or having been superimposed with alternating current. Any of these power supplies are fundamentally classified as direct current and have a drawback that the etching pits may deeply grow into the metal to penetrate there through to give the foil of larger effective surface area but simultaneously, to extremely lower its mechanical strength.

The present inventors have investigated the configurations of the etching pits by observing them with an electron microscope in terms of the influence of the above points. As a result of the observation, they have found that by performing the etching operation under given conditions with an alternating current power supply, a configuration of etching pit, which cannot be expected with a direct current power supply, is obtained and it is possible to grow the etching pits deeply without adversely affecting the mechanical strength of the foil.

Namely, when an alternating current is supplied from the power source 1, in an arrangement shown in FIG. 1, through carbon electrodes 2 and 2', the etching of the aluminum foil 5 proceeds as follows. Firstly, when the electric potential of the carbon electrode 2 is positive against that of the carbon electrode 2', each of the chloride ions of negative charge in the etching solution 4 contained in an etching cell 3 moves to the side of the carbon electrode 2, and one of the surface of the aluminum foil 5, facing the carbon electrode 2', is subjected to the etching action of the chloride ions. At the same time, the additive contained in the solution acts to form an oxide film on the surface of the aluminum foil 5. Next, when the potential of the carbon electrode 2 is reversed negative against that of the carbon electrode 2', another surface of the aluminum foil 5 facing the carbon electrode 2 is then subjected to the etching action of the chloride ions because each of the chloride ion moves to the side of the carbon electrode 2'. At that time, although hydrogen gas evolves at the surface of the aluminum foil 5 facing the carbon electrode 2', it serves to disperse the aluminum ions present in the vicinity of the surface of the aluminum foil in a high concentration as well as to make the chemical activity of the surface of the aluminum foil even. Accordingly, when the potential of the carbon electrode 2 is reversed positive again, the etching action will not necessarily be initiated at exactly the same positions of the etching pits formed previously, thus preventing the growthes of straight etching pits which are often observed with the direct current etching process and giving a porous and sponge-like configuration of the surface in a form of an aggregation of minute pits to the foil. Moreover, it is advantageous in that the core portion of the foil remains without being etched to effectively prevent the conspicuous decrease in the mechanical strength, because the etching pit will not grow so deeply to penetrate through the foil as is inevitable in the case of the direct current etching process.

Incidentaly, in the arrangement shown in FIG. 1, the two carbon electrodes are employed and an alternating current is flown through the electrodes though, it is confirmed that a similar result can be obtained in an experiment wherein an alternating current is flown through one of the carbon electrode and the aluminum foil. In this case, however, the etching action is only effected during period of half cycle of the power supply when a positive potential is applied at the aluminum foil and therefore only half of the supplied electric power is utilized in the etching process. Moreover, the latter is not practical in view point of the equipment, because it necessitates a device for flowing a great amount of current directly through the aluminum foil.

In performing the method of the present invention, the frequency of the power source and the current density should carefully be maintained within predetermined optimum ranges. In connection with the frequency of the power source, it is obvious that the lower the frequency, the more the configurations of the etching pits proximate to those obtained with direct current. Particularly with an alternating current of a frequency under 5 Hz, the etching pits grow deeply into the foil but are of large sizes and are not evenly distributed over the surface of the foil. Moreover the number of the pits decrease to reduce the extending rate in the effective surface area.

On the other hand, in higher frequency, the conditions of the etching become to demonstrate a fine etched surface peculiar to the alternating current etching. Particularly, when the frequency exceeds 120 Hz, the minute etching pits formed on the surface do not grow deeply into the foil and are limited only to the surface as the surface polishing to reduce the extending rate of the effective surface area as in the case of the frequency being under 5 Hz.

In connection with the current density, it is confirmed that when it is low, the etching conditions tend to proximate to those in the directric current etching process to promote a deep growth of the etching pit but to make the distribution of the etching pits over the surface uneven. Particularly with a current density under 0.1 A/cm$^2$, the etching pits grow deeply into the foil but are small in number and not evenly distributed over the surface of the foil as in the case of the low frequency power supply.

When the current density exceeds 0.6 A/cm$^2$, only the surface of the foil dissolve without the deep growth of the pits and no extension of the effective surface area cannot be expected.

Time is also a dominating factor which influences the performance of the etching operation as well as the configuration of the etched surface. However this factor is highly dependent on the other factors involved and cannot be determined unconditionally with the above mentioned conditions. What can safely indicated here is that the time should be set to correspond to power consumption approximately equal to [170] *85* coulomb/cm$^2$ in the case of foil thickness is 100 μm, or to the dissolution of the aluminum metal into the etching solution up to approximately [80] *8.0* mg/cm$^2$ of the foil.

In the following description, the present invention will be elucidated in more detail by way of examples, presented in contrast with results of the comparative experiments.

EXAMPLES 1 AND 2 (COMPARATIVE EXPERIMENTS 1, 2 AND 3).

Under conditions summarized in Table 1 below, the etching treatments on the sample aluminum foils (purity, 99.9%; area, 10 cm$^2$, thickness, 100 μm) are performed.

TABLE 1

| Example | Electrolyte in the etching solution | Frequency of the power source (Hz) | Current density (A/cm$^2$) | Time (min. sec.) | Temp. (°C.) | Aluminum dissolved into the solution (mg/cm$^2$) |
|---|---|---|---|---|---|---|
| 1 | HCl 1.3 N<br>$H_3PO_4$ 0.1 mole/liter | 60 | 0.5 | 2.50 | 45 | 7.9 |
| 2 | HCl 1.3 N<br>$H_3PO_4$ 0.1 mole/liter | 20 | 0.3 | 4.45 | 35 | 7.6 |
| Comparative Experiment | | | | | | |
| 1 | NaCl 3.5 mole/liter<br>$Na_2SO_4$ 0.3 mole/liter | (D.C.) | 0.5 | 2.30 | 95 | 8.0 |
| 2 | HCl 1.6 N<br>$HNO_3$ 0.1 mole/liter<br>$H_3PO_4$ 0.1 mole/liter<br>$H_2SO_4$ 0.005 mole/liter | (D.C.) | 0.7 | 1.45 | 70 | 8.1 |
| 3 | HCl 1.3 N | 60 | 0.5 | 2.50 | 45 | 8.0 |

In evaluating the performance of the etching processes, each of the etched sample foils is first anodized in an aqueous electrolytic solution containing boric acid at 3% and ammonium borate at 3%, at 30° C.±2° C., up to the formation of oxide film which corresponds to the final formation current under 0.5 mA/10 cm$^2$ at 80 V, and its electrostatic capacitance is measured in an aqueous ammonium borate (8%) solution at 30° C.

The durability of the etched foil against folding distorsion (hereinafter, to be simply referred to as "bending strength") is measured by repeatedly bending (90°) a free end of the foil (10 mm in width) dangled with a weight of 200 g from a clip whose grasping tips are rounded (radii of curvature, 0.2 mm) until being finally cut to be separated.

The count in the repeat of each of the right and leftwards bending is taken as a relative scale for expressing the "bending strength".

The results of these evaluations are summarized in Table 2 below.

TABLE 2

| | | Electrostatic capacitance (μF/cm$^2$) | Bending strength (count) |
|---|---|---|---|
| Example | 1 | 3.7 | 68 |
| | 2 | 5.5 | 64 |
| Comparative experiment | 1 | 5.1 | 3 |
| | 2 | 2.9 | 5 |
| | 3 | 2.0 | 72 |

As can be apparent from the results shown in Table 2, the aluminum foils etched by the method in accordance with the present invention are of high electrostatic capacitance and of great mechanical strength as compared with those etched by the methods of the comparative experiments.

These results also support the importance of a deliberate selection and combination of the conditions, i.e., current density, frequency and temperature which may cause a difference in the electrostatic capacitance of the etched foil. Thus an ingenious contrivance is required in the selection of one these factors in view of the other which may have an interaction or a mutual dependency on the former.

EXAMPLES 3-10 (COMPARATIVE EXPERIMENT 4)

Next, the influences of the species of the electrolytes in the etching solution on the electrostatic capacitance and mechanical strength of the sample foils are investigated with other operational conditions listed below to obtain the results of the measurements summarized in Table 3.

| Conditions: | |
|---|---|
| Sample aluminum foil: | purity 99.99%<br>thickness, 65 μm |
| Concentration of HCl: | 2.0 N |
| Current density: | 0.4 A/cm$^2$ |
| Frequency of power source: | 50 Hz |
| Time: | 2'15" |
| Temperature: | 40° C. |
| Aluminum dissolved: into the solution | 5.0 mg/cm$^2$ |

TABLE 3

| Example | Additive and its concentration in the etching solution (mole/liter) | Electrostatic capacitance at 80 V formation (μF/cm$^2$) | Bending strength (count) |
|---|---|---|---|
| 3 | Acetic acid (0.35) | 3.5 | 32 |
| 4 | Oxalic acid (0.35) | 4.1 | 30 |
| 5 | Glycolic acid (0.35) | 3.9 | 34 |
| 6 | Sulfuric acid (0.01) | 4.4 | 31 |
| 7 | Boric acid (0.15) | 3.2 | 30 |
| 8 | Sulfamidic (0.15) | 4.0 | 31 |
| 9 | Nitric acid (0.015) | 2.9 | 35 |
| 10 | Nitric acid (0.05)<br>Phosphoric acid (0.05)<br>Sulfuric acid (0.005) | 4.7 | 29 |
| Comparative experiment | | | |
| 4 | None | 2.3 | 34 |

As indicated in the above Table 3, an addition of one or more auxiliary agent capable of anodizing aluminum, i.e., forming an oxide film on the surface of the metal, is found to prove a great advantage to the enlargement in the electrostatic capacitance of the sample foil.

EXAMPLES 11-14.

Next, the influence of the current density at the etching process on the electrostatic capacitance and the mechanical strength of the foil is investigated to obtain results summarized in Table 4 below.

The other conditions employed in this investigation are set as follows:

Sample aluminum foil:
purity, 99%
thickness, 90 μm
Electrolytes in the aqueous etching solution:
HCl: 1.0 N
Oxalic acid: 0.06 mole/liter
Frequency of the power source: 40 Hz
Time: 1'15"
Temperature: 40° C.
Aluminum dissolved into the solution: 7.0 mg/cm$^2$

TABLE 4

| Example | Current density A/cm$^2$ | Electrostatic capacitance (at 80 V formation) | Bending strength (count) |
|---|---|---|---|
| 11 | 1.0 | 3.9 | 58 |
| 12 | 0.3 | 5.1 | 55 |
| 13 | 0.1 | 3.7 | 53 |
| 14 | 0.03 | 2.2 | 47 |

As indicated in the above Table 4, the electrostatic capacitance of the sample foil is greatly influenced by the current density.

Under similar conditions as described above, experiments are performed to obtain results represented by FIGS. 2, 3, 4 and 5, respectively.

Figure 2:
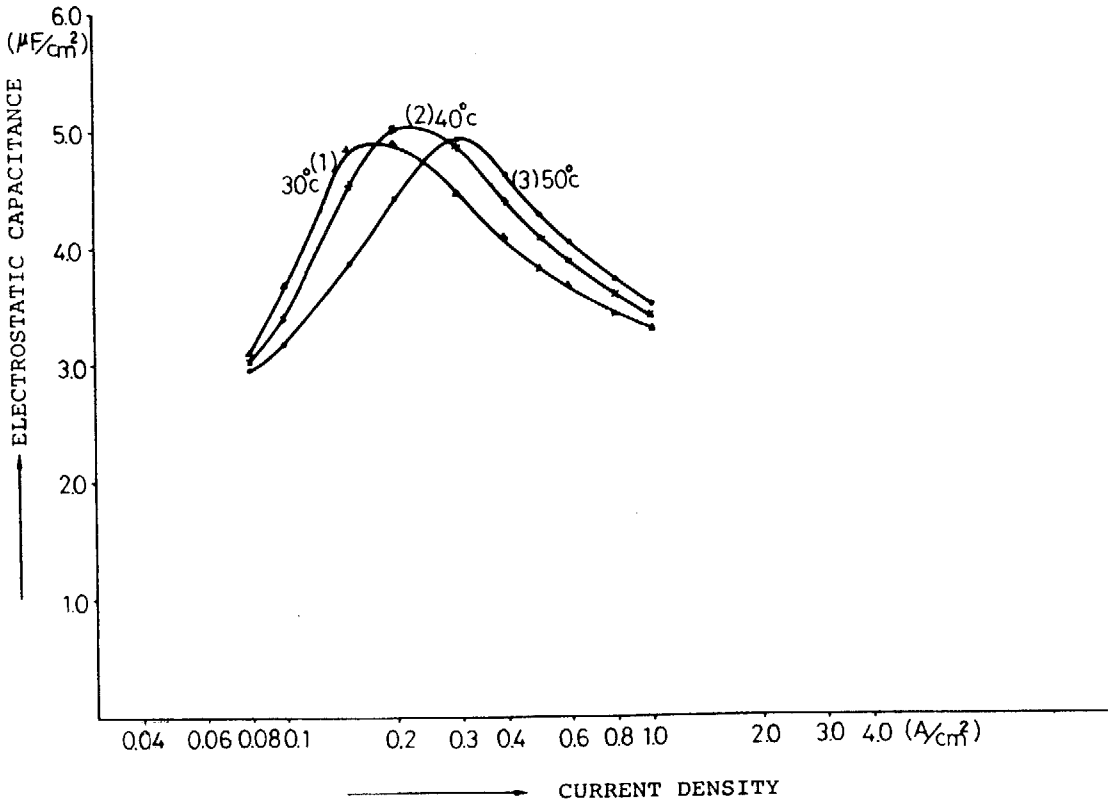
FIGS. 2–5, are graphic representations of the influences of the current density and the bath temperature on the electrostatic capacitance, those of the species and concentrations of the additives on the electrostatic capacitance, those of the concentrations of the hydrogen chloride and the bath temperatures on the electrostatic capacitance, and those of the frequency of the power supply at the etching process and formation voltages on the electrostatic capacitance, respectively.

FIG. 2 illustrates the interaction between the current density and the temperature of the etching solution, which influences on the electrostatic capacitance of the etched foil.

Figure 3:
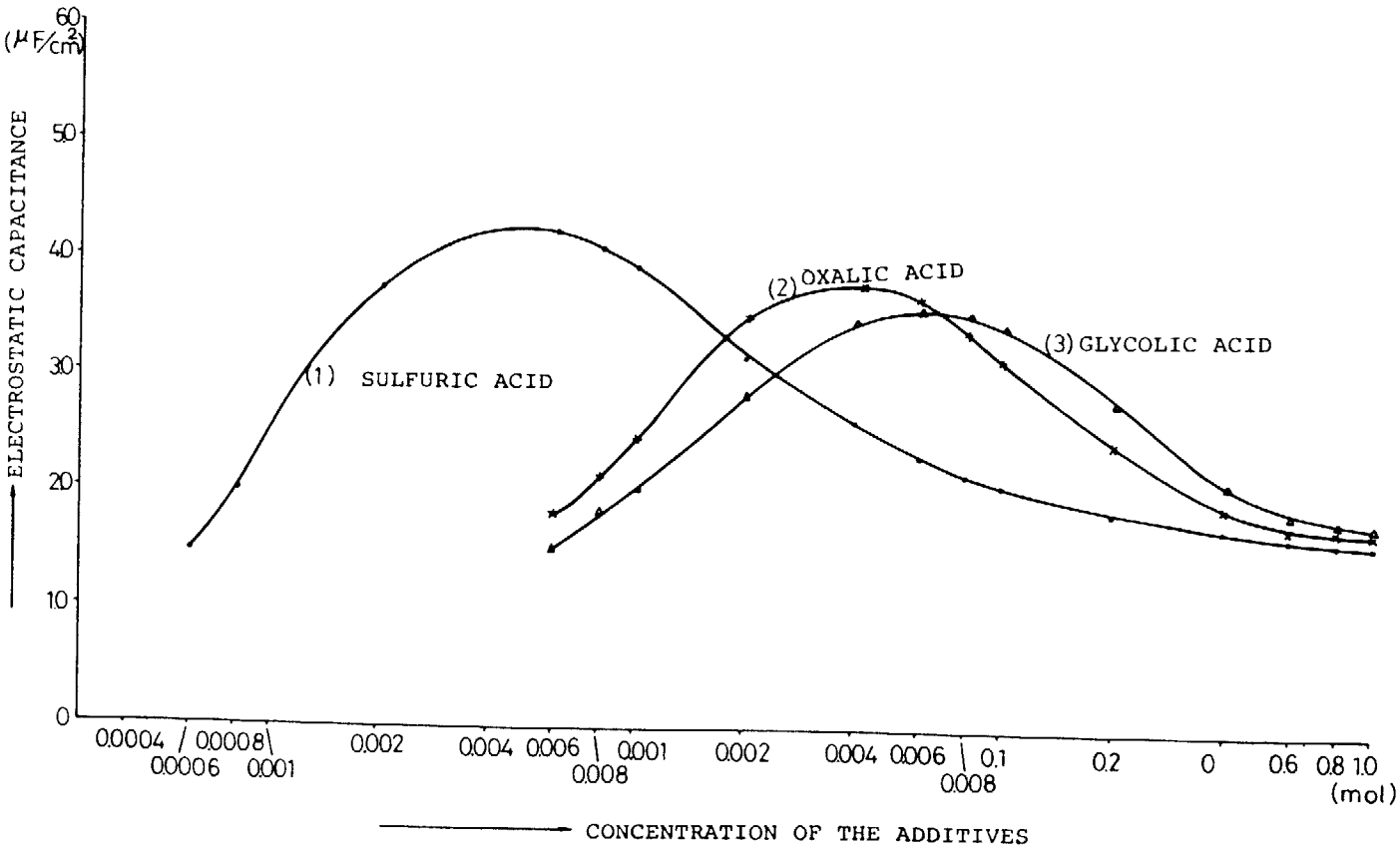

FIG. 3 illustrates the changes in the electrostatic capacitances of the etched foils, with the changes in the additives, i.e., sulfuric acid, oxalic acid and glycolic acid, and in their concentration in the etching solution.

Figure 4:
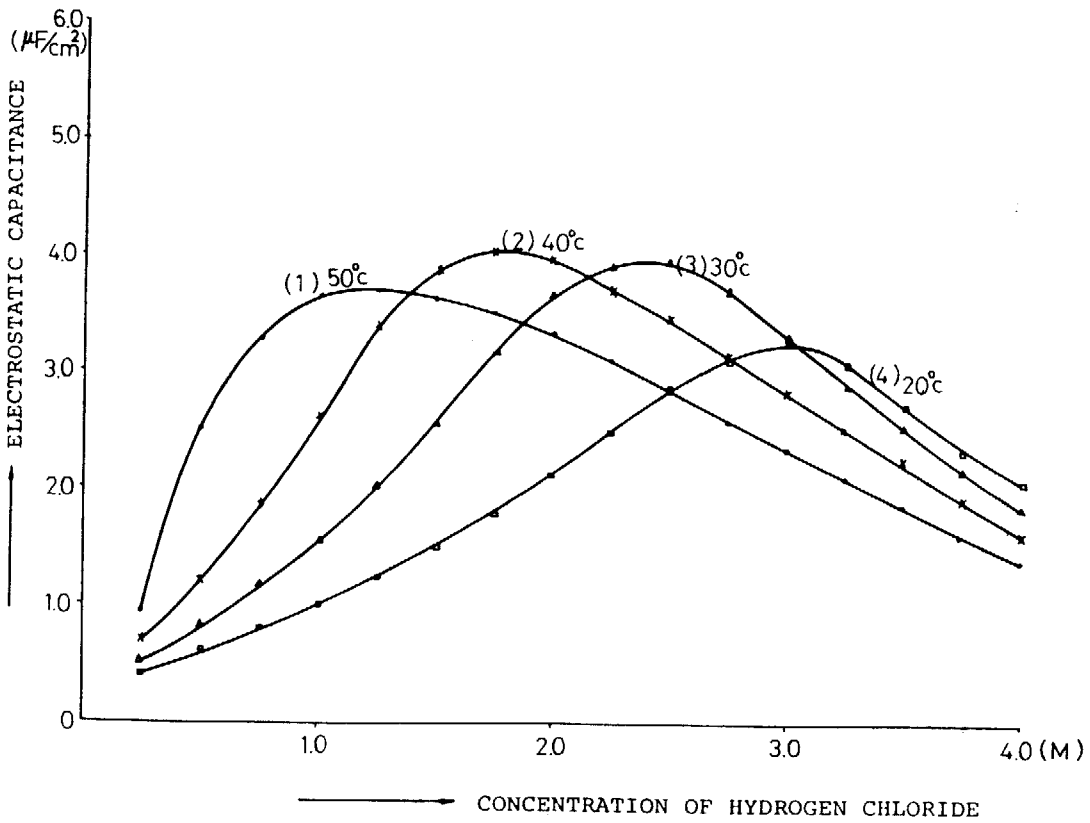
Figure 5:
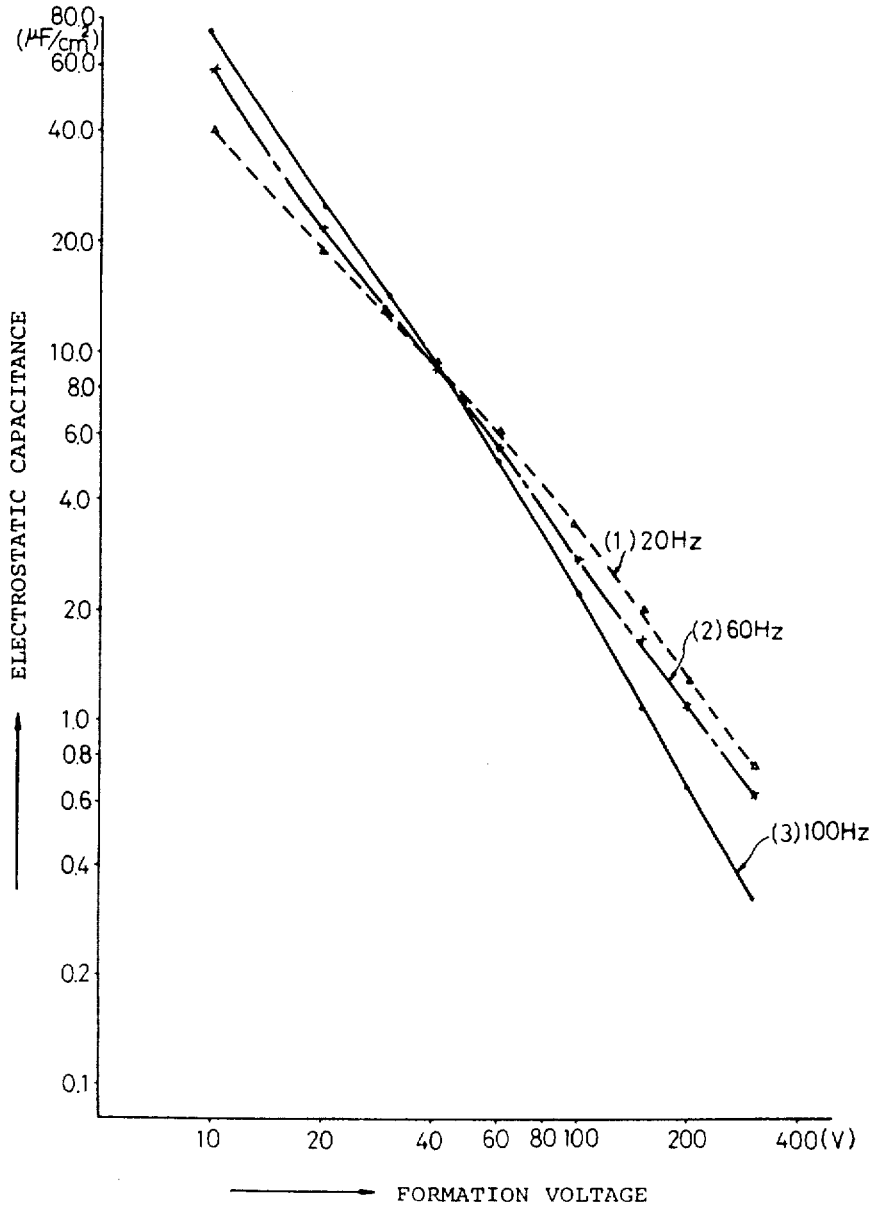

FIG. 4 illustrates the changes in the electrostatic capacitance of the etched foils, with the changes in the concentration of the hydrogen chloride in the etching solution, and in the temperature of the solution, and FIG. 5 illustrates the changes in the electrostatic capacitance of the etched foils with the changes in the formation voltage in the cases of the frequencies of the etching power source are 20 Hz, 60 Hz and 100 Hz, respectively.

What is claimed is:

[1. In the method for producing electrodes for use in aluminum electrolytic capacitor whose effective surface area is enlarged by electrochemically etching aluminum foil in an aqueous solution including hydrogen chloride and at least one additive capable of anodizing said aluminum foil with electric powder supplied in alternating current, an improvement characterized in that;

the concentration of the hydrogen chloride in said solution is set at a range between 0.5 N and 3.5 N, the concentration of said additive is set at arrange between 0.001 mole/liter and 0.4 mole/liter, the frequency of said alternating current power supply is ranging from 5 Hz to 120 Hz and its current density is ranging from 0.1 A/cm$^2$ to 0.6 A/cm$^2$, while the temperature of said solution is being maintained at 25° C.-60° C.]

[2. A method as claimed in claim 1, further characterized in that;

said additive is selected from the group consisting of aliphatic monocarboxylic acid, aliphatic dicarboxylic acid, aliphatic oxycarboxylic acid and inorganic acid capable of anodizing (forming an oxide protecting layer on the surface of) aluminum.]

[3. A method as claimed in claim 1, further characterized in that;

said additive is one selected from the group consisting of acetic acid, oxalic acid, malonic acid, succinic acid, glutaric acid, adipic acid, maleic acid, fumaric acid, glycolic acid, lactic acid, malic acid, tartaric acid, citric acid, nitric acid, phosphoric acid, sulfuric acid, boric acid and sulfamilic acid, and any salt thereof.]

*4. In the method for producing electrodes for use in aluminum electrolytic capacitor whose effective surface area is enlarged by electrochemically etching aluminum foil in an aqueous solution including hydrogen chloride and at least one additive capable of anodizing said aluminum foil with electric power supplied in alternating current, an improvement characterised in that;*

*the concentration of the hydrogen chloride in said solution is set at a range between 0.5 N and 3.5 N, the concentration of said additive is set at a range between 0.001 mole/liter and 0.4 mole/liter, the frequency of said alternating current power supply is ranging from 5 Hz to 120 Hz and its current density is ranging from 0.1 A/cm$^2$ to 0.6 A/cm$^2$, while the temperature of said solution is being maintained at 25° C.-60° C.,*

*said additive being acetic acid or a salt thereof.*

*5. In the method for producing electrodes for use in aluminum electrolytic capacitor whose effective surface area is enlarged by electrochemically etching aluminum*

*foil in an aqueous solution including hydrogen chloride and at least one additive capable of anodizing said aluminum foil with electric power supplied in alternating current, an improvement characterized in that;*

*the concentration of the hydrogen chloride in said solution is set at a range between 0.5 N and 3.5 N, the concentration of said additive is set at a range between 0.001 mole/liter and 0.4 mole/liter, the frequency of said alternating current power supply is ranging from 5 Hz to 120 Hz and its current density is ranging from 0.1 A/cm$^2$ to 0.6 A/cm$^2$, while the temperature of said solution is being maintained at 25° C.–60° C.,*

*said additive being glycolic acid or a salt thereof.*

*6. In the method for producing electrodes for use in aluminum electrolytic capacitor whose effective surface area is enlarged by electrochemically etching aluminum foil in an aqueous solution including hydrogen chloride and at least one additive capable of anodizing said aluminum foil with electric power supplied in alternating current, an improvement characterized in that;*

*the concentration of the hydrogen chloride in said solution is set at a range between 0.5 N and 3.5 N, the concentration of said additive is set at a range between 0.001 mole/liter and 0.4 mole/liter, the frequency of said alternating current power supply is ranging from 5 Hz to 120 Hz and its current density is ranging from 0.1 A/cm$^2$ to 0.6 A/cm$^2$, while the temperature of said solution is being maintained at 25° C.–60° C.,*

*said additive being boric acid or a salt thereof.*

*7. In the method for producing electrodes for use in aluminum electrolytic capacitor whose effective surface area is enlarged by electrochemically etching aluminum foil in an aqueous solution including hydrogen chloride and at least one additive capable of anodizing said aluminum foil with electric power supplied in alternating current, an improvement characterized in that;*

*the concentration of the hydrogen chloride in said solution is set at a range between 0.5 N and 3.5 N, the concentration of said additive is set at a range between 0.001 mole/liter and 0.4 mole/liter, the frequency of said alternating current power supply is ranging from 5 Hz to 120 Hz and its current density is ranging from 0.1 A/cm$^2$ to 0.6 A/cm$^2$, while the temperature of said solution is being maintained at 25° C.–60° C.,*

*said additive being sulfamidic acid or a salt thereof.*

* * * * *